May 19, 1942.     A. STANWORTH     2,283,514
TOOL AND HOLDER STRUCTURE
Filed March 6, 1941
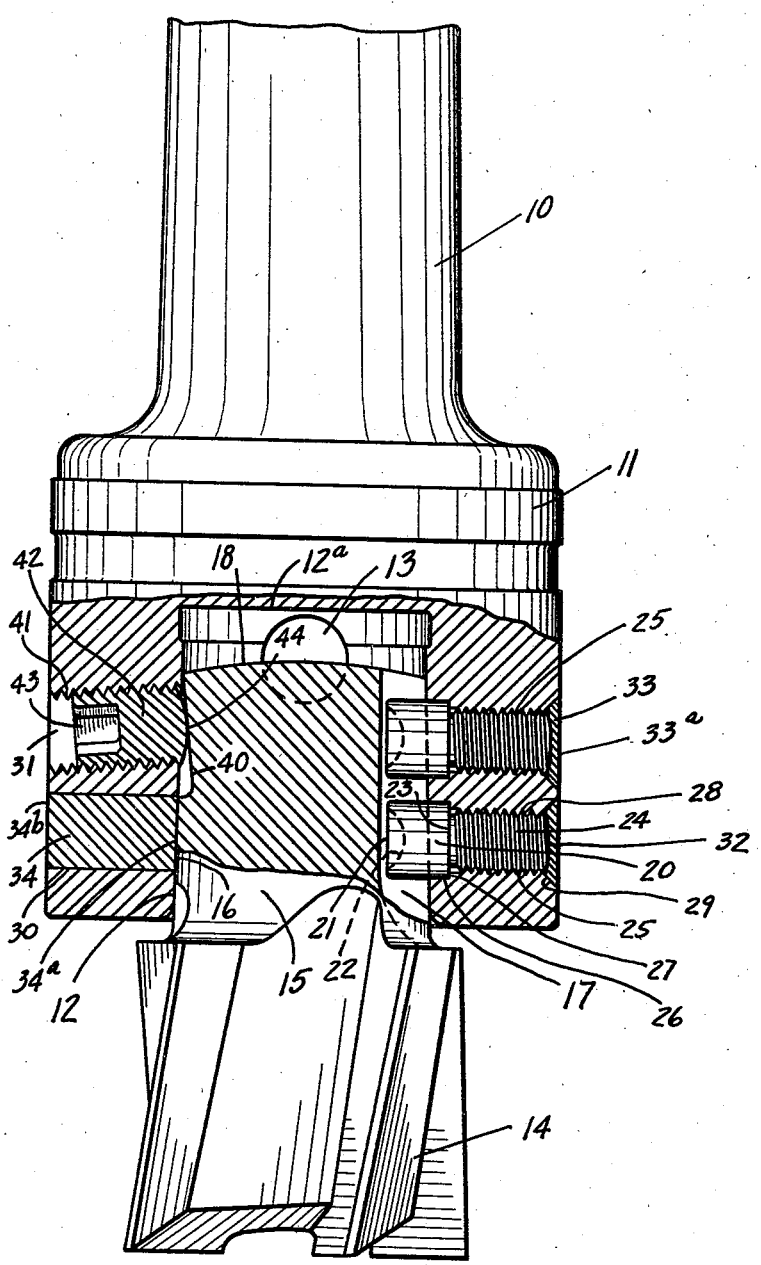
INVENTOR.
ARTHUR STANWORTH.
BY Lockwood, Goldsmith & Galt,
ATTORNEYS.

Patented May 19, 1942

2,283,514

UNITED STATES PATENT OFFICE 2,283,514

TOOL AND HOLDER STRUCTURE

Arthur Stanworth, Lebanon, Ind.

Application March 6, 1941, Serial No. 381,985

6 Claims. (Cl. 279—83)

This invention relates to tool holders and tools of the general character illustrated in the Arthur Stanworth prior Patent No. 1,505,977, dated August 26, 1924.

The chief object of the present invention is to provide an interlocking construction which not only incorporates and retains all of the advantages of the construction shown in the before mentioned patent, but also has additional advantages, such as the positive elimination of all possibilities of shear, prevention of tool chattering upon the work, damage to the tool or work by reason of separation of the tool and holder, the present invention requiring positive action on the part of the machinist to release the tool from the holder.

In common with the disclosure of the aforesaid patent, this invention provides for the material reduction in the cost of tools manufactured of high speed and special alloy steel.

Also in common with the disclosure of the before mentioned patent, the present invention contemplates the formation of the several tools, the same being interchangeably associated with the holder, the latter being of less costly steel, or the like, and the former being of the more costly steel, the tool being provided with a relatively short, slightly tapering shank, ground and fitted to the slightly tapering socket formed in the tool holder.

The present invention is particularly directed to the interlocking connection between the tool shank and the holder socket for tool driving and tool retention purposes.

Other objects and features of the invention will be set forth more fully hereinafter.

The full nature of the invention will be understood from the accompanying drawing and the following description and claims:

In the drawing, there is illustrated substantially to exact size, one embodiment of the invention, the same being shown in elevation, parts being broken away to show the same and other parts in central section, and also in elevation.

In the figure, the numeral 10 indicates a relatively elongated, appropriately tapered shank of the tool holder, the same having a head portion 11 provided with an axial, slightly tapered socket opening therein. This socket opening and socket arrangement is ground to size and coaxially located with reference to the longitudinal central axis of the tool holder.

Extending through the head structure are the aligned openings 13 which are so positioned that a tapered drift or pin can be inserted therein for forcing from the socket opening the shank of the tool when one of the interlocking connections is released.

The operation of tool removal is substantially that disclosed in the before mentioned patent, and no further comment or description is believed necessary.

The aligned openings 13 may be tapered as shown in Fig. 3 at B—3 in said patent, or may be of non-tapering type, as desired or required.

The tool may be a drill, reamer, spiral end mill, counterbore or the like, and may be constructed for working upon wood or metal or other materials. Herein, there is illustrated a right hand spiral end mill tool 14 provided with a shank 15, the latter being relatively short, as shown, and having an exterior surface 16 slightly tapered and suitably ground and finished to conform to the slightly tapering socket 12 of the head or holder arrangement. Thus, the shank 15 can be wedgingly associated with the socket.

It will be apparent that when the shank 10 is rotated, the tool portion 14 should be rotated therewith and that in view of the resistance to working, which is normally encountered, this wedging or seating association between the shank and socket is insufficient to insure tool rotation. Accordingly, and as broadly illustrated in the before mentioned patent, there is provided in the shank 15 of the tool 14, an elongated longitudinal peripheral groove 17. The width of this groove is identical throughout its length. The length of this groove, as herein illustrated and thereby differing from the patent disclosure, is substantially coextensive with the length of the shank 15 of the tool 14.

The socket receivable end of the shank 13 is preferably partially spherical in form, the radius of curvature being relatively large and the center being substantially coincident with the longitudinal axis of the tool holder when the tool and holder are properly associated together. As shown clearly in the drawing, the root of the groove 17 provides a flat face substantially parallel to a plane including the longitudinal axis of the shank and tool when associated together.

In the present invention, the driving connection includes a pin or a pair of pins. Since both pin structures are identical, a description of one will suffice for the other. Herein the pin includes a head portion 20 which is substantially cylindrical in form and has a flat face 21. This flat face is provided with an arcuate groove 22, the same being formed by a Woodruff key seater tool. The purpose of this groove is so that it can receive the end of a screw driver, or similar tool.

Projecting from the opposite face 23 providing a shoulder on said face, is the threaded extension 24. The head portion 11 is provided with a radial bore, indicated generally by the numeral 25, and the same is enlarged at 26 where it communicates with the tapered bore or socket 12, forming a shoulder 27 between portions 26 and 25. The portion 25 is threaded as at 28 and where the bore 25 is exposed on the exterior of the socket or head 11, the same is countersunk, as at 29.

Diametrically opposite each of the bores 25, there are provided openings 30 and 31. The opening 30 is in longitudinal alignment. The opening 31 is slightly offset regarding longitudinal alignment, as hereinafter pointed out. A drill is passed through the opening 30 and forms the opening 25 and then a counterboring tool is applied to form the cylindrical enlargement 26 and the shoulder 27.

The thread formation 28 may be formed by tapping from either end, as found most expedient. The countersunk portion is formed from the outer end. The opening 31 which is the so-called upper opening, while inclined upwardly, is nevertheless of sufficient size to permit the drill to pass through the same for drilling the upper opening 25 and also to permit the counterboring tool to pass through the same without interference and form the shouldered recess 26 of the upper bore structure.

The driving pin arrangement illustrated herein, therefore, includes a plurality of superposed pins, the axes of both pins lying in a common plane and that plane including the central axis of the tool and tool holder. The pins following the formation of the bores are applied and threaded "home" until the pin shoulder 23 engages the bore shoulder 27 and further seating of the head portion 20 of the pin in the recess 26 of the bore is prevented. This insures positive bearing between shoulders 23 and 27. Thereafter, the free end of the threaded portion 24, which is exposed by the countersunk portion 29 of the head 11, is peened over, as shown and indicated by the numeral 32. This positively locks the driving pins in proper position. Thereafter any suitable filler, such as solder, babbitt, or the like, indicated by the numeral 33, is applied to the countersunk portion of the opening 25 and completely fills the same and the surplus is removed and the outer surface 33a is made to conform to the outer surface of the holder head.

Since the two side planes of the longitudinal peripheral groove 17 are parallel and they are spaced apart a distance equal to the diameter of the head portion 20, it will be noted that there is insured positive rotation of the tool 14 without appreciable backlash whenever the shank 10 of the holder is rotated, whether that be to the right or left.

With the structure shown in the patent before mentioned, occasionally the single pin would shear; hence, the inclusion of two pins insures non-shearing of the driving connection. Furthermore, considerable difficulty has been encountered from time to time in properly mounting the driving pin of the before mentioned patent, so that shoulder to shoulder contact was obtained. The thread-type mounting herein positively insures shoulder to shoulder contact and, therefore, fixed connection of the pin to the head prior to the permanent anchoring of the pin to the head, as by means of the peening and the like, last mentioned.

It also will be quite apparent that this driving connection arrangement as well as that shown in the patent, has no holding power insofar as holding the tool in the holder against axial displacement is concerned. The structure shown in the before mentioned patent, is solely dependent upon the driving taper relationship. The present invention continues to utilize that relationship but there is provided a positive lock between the holder and the tool.

With the structure of the before mentioned patent, rotation in the cutting direction for a right hand spiral cutter normally tends to have the cutter dig into the work and in so doing there is a tendency for the aforesaid action to pull the cutter out of the holder. The present invention prevents that action, although it does not remove that tendency which is inherent in the use of the before mentioned tool in the manner indicated.

It will be noted that the opening 30, provided in the wall of the holder socket in order to permit counterboring, et cetera, of the lower driving pin receiving bore 25, is preferably filled with suitable material, such as lead, babbitt, or the like, similar, for example, to that utilized at 33, and the same herein is indicated by the numeral 34. Its inner and outer ends 34a and 34b are suitably finished to conform to the surface of the tapered socket opening 12 and the exterior surface of the head structure 11.

The shank 15 of the tool is provided with a surface 40. This surface 40 is somewhat elongated and is of some width. The plane of this surface is inclined to a plane parallel to the plane including the central axis of the shank and in an amount approximately that equal to the inclination of a plane tangent to the shank, all four planes being perpendicular to a common plane including the axes of the driving pins. The foregoing description of the amount of inclination of the surface 40 is given by way of example only for in all instances the surface 40 is inclined oppositely with respect to the tangent plane.

The opening 31 has its central axis preferably inclined upwardly and lying in the plane of the axes of the two driving pins. The direction of inclination is such that the axis of the opening 31 is perpendicular to the plane, including the surface 40. The wall of this opening 31 is suitably threaded as at 41 and threadingly mounted therein is a lock or so-called headless setscrew 42, having a tool engageable exposed end 43 at one end and a partially spherical head portion 44 at the other end, the latter having central contact with the surface 40.

When the tool shank 15 is presented to the head socket 12 with the pins 20 in alignment with the longitudinal peripheral groove 17, the tool then is elevated in the socket and "jammed home." Thereafter the headless setscrew 42 is screwed inwardly toward the socket 12 until the rounded screw end 44 engages surface 40. Continued screwing action is applied and the effect thereof is to draw upwardly and inwardly into the socket 12 the tool shank 15. The relationship also is such that any force, such as before described, tending to pull or draw the tool shank from its holder, is resisted. Thus, accidental disconnection or release of the tool from the socket is prevented.

Whenever it is desired to remove a tool and replace the same with a different tool having a shank identical to that shown at 15, a drift pin is inserted in the opening 13 and the wedging arrangement provided between the head 12a of the socket and the head 18 of the shank will be such that whenever the setscrew 42 is sufficiently retracted, the shank of the tool can be readily released from the holder and a new tool or substitute tool replaced after the drift pin has been removed. This new tool after having been jammed "home," as aforesaid, is locked by means of the headless setscrew.

While the invention has been illustrated and described in great detail in the drawing and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In the combination of a tool having a short slightly tapered shank, said shank having a longitudinal groove in the shank periphery and a holder having a head portion including a complementary tapered socket therein for tool shank reception, said head portion having a radial bore enlarged in the socket end, said bore enlargement including an inward shoulder, the bore including a thread arrangement, a groove seating driving pin having a head portion providing a shoulder for bore shoulder engagement, said pin head portion projecting into said socket for tool shank longitudinal groove reception, the width of the groove being just sufficient to receive the pin head portion, the pin bore receivable portion having thread means thereon permitting pin threading in the bore for drawing the pin into the bore and securing the shoulders in positive engagement, one end of the pin having a tool engageable portion for effecting such threading, a longitudinally directed surface on the tool shank inclined oppositely to the taper thereof, a threaded bore extending through the socket wall of the head portion, the longitudinal axis of the second mentioned bore being substantially transverse to the inclined surface of the tool shank when seated in the socket, and threaded means in the second mentioned bore having pressure engagement with the longitudinally directed oppositely inclined surface for imposing a force component upon the socket seated shank parallel to the longitudinal axis thereof and the holder and in the shank seating direction.

2. A structure as defined by claim 1, characterized by the second mentioned bore being positioned substantially diametrically opposite the first mentioned bore and the inclined surface on the tool shank being diametrically opposite the longitudinal peripheral groove.

3. A structure as defined by claim 1, characterized by the first mentioned bore including an enlarged portion opposite the shoulder forming enlargement and the threaded pin secured therein having its end opposite the shouldered head portion laterally enlarged for permanent pin anchorage.

4. A tool structure of the character defined by claim 1, characterized by the socket having a third bore parallel to the first mentioned bore and identical thereto, the longitudinal axes of the first and third mentioned bores lying in a plane including the longitudinal axis of the holder, and a second driving pin identical to the first mentioned driving pin and identically secured in the third mentioned bore and adapted to seat in the tool shank longitudinal groove, the latter being of sufficient length for multiple pin head reception, the multiple pin head and first mentioned longitudinal groove association preventing cocking of the tool shank in the holder socket.

5. In the combination of a tool having a short, slightly tapered shank, said shank having a longitudinal groove in the shank periphery and a holder having a head portion including a complementary tapered socket therein for tool shank reception, said head having a radial bore which is enlarged in the socket end thereof to provide an inward shoulder, a groove seating driving pin permanently and immovably secured in the radial bore and having a head portion providing a shoulder for bore shoulder engagement, the pin head portion projecting into the socket for tool shank longitudinal groove reception, the width of the groove being just sufficient to receive the pin head portion, a longitudinal surface on the tool shank periphery inclined oppositely to the taper thereof, a threaded bore extending through the socket wall of the head portion, the longitudinal axis of the second mentioned bore being substantially transverse to the inclined surface of the tool shank when seated in the socket, and threaded means in the threaded bore and having pressure engagement with the longitudinally directed oppositely inclined surface for imposing a force component upon the socket seated shank parallel to the longitudinal axis thereof and the holder and in the shank seating direction.

6. A structure as defined by claim 5, characterized by the second mentioned bore being positioned substantially generally diametrically opposite the first mentioned bore and the inclined surface on the tool shank being diametrically opposite the longitudinal periphery groove.

ARTHUR STANWORTH.